US008770704B2

(12) United States Patent
Allred et al.

(10) Patent No.: US 8,770,704 B2
(45) **Date of Patent: *Jul. 8, 2014**

(54) JOB CHANGE SCRAP REDUCTION

(75) Inventors: Donald R. Allred, Springboro, OH (US); James A. Katerberg, Kettering, OH (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,548

(22) Filed: Jun. 28, 2012

(65) Prior Publication Data

US 2014/0002528 A1 Jan. 2, 2014

(51) Int. Cl.
*B41J 29/393* (2006.01)
*G06F 15/00* (2006.01)

(52) U.S. Cl.
USPC .......................................... 347/19; 358/1.15

(58) Field of Classification Search
USPC ........................... 347/19; 358/1.15, 1.16, 1.9
See application file for complete search history.

(56) References Cited

U.S. PATENT DOCUMENTS

| | | | | |
|---|---|---|---|---|
| 6,762,855 | B1 | 7/2004 | Goldberg et al. | |
| 7,354,129 | B2 * | 4/2008 | Uchida | 347/19 |
| 7,911,636 | B2 | 3/2011 | Kahn et al. | |
| 7,967,423 | B2 | 6/2011 | Katerberg | |
| 8,083,343 | B2 * | 12/2011 | Ikuno et al. | 347/105 |
| 8,646,905 | B2 * | 2/2014 | Iijima et al. | 347/104 |
| 2010/0304667 | A1 | 12/2010 | Chen et al. | |
| 2012/0027176 | A1 | 2/2012 | Heid | |
| 2012/0050786 | A1 | 3/2012 | Rudolph et al. | |

* cited by examiner

*Primary Examiner* — Lamson Nguyen
(74) *Attorney, Agent, or Firm* — Nelson Adrian Blish

(57) ABSTRACT

Reducing waste in a digital printing system (200) includes moving media (214) through a web transport system (205) at a first speed. A first job is printed on the print media and a downstream finishing device (203) in a first configuration acts on the media. The web slows to a second speed prior the end of the first job and the finishing device changes to a second configuration after the first job has passed. A time to complete changing from the first to the second configuration is estimated and a time for a first section of the media containing the end of the first job to arrive at the finishing device is estimated. A second job is printed on the media prior to completion of the change based on the estimated time to completion.

6 Claims, 3 Drawing Sheets

JOB CHANGE SCRAP REDUCTION

CROSS REFERENCE TO RELATED APPLICATIONS

Reference is made to commonly-assigned copending U.S. patent application Ser. No. 13/535,543 filed Jun. 28, 2012, entitled JOB CHANGING SCRAP REDUCTION, by Allred et al.; the disclosure of which is incorporated herein.

FIELD OF THE INVENTION

This invention relates to printing in general and in particular to reducing waste in the printing process.

BACKGROUND OF THE INVENTION

Very high speed commercial digital presses print variable data at rates of up to thousands of pages per minute. Such commercial digital presses commonly print on a print media supplied as rolls of print media. A continuous web of the print media is fed through the digital press and is printed on one or both sides of the print media using one or more printheads. The web of print media can then be fed to finishing equipment that converts the print media from a continuous web format to the desired final form needed for the consumer. Finishing equipment can include, but is not limited to, slitters, cutters, perforators, post-coating equipment, and folders.

Each print job can include different setup conditions for the various finishing equipment. To facilitate such print job specific setups, automatic finishing equipment has been developed which is able to receive setup instructions from a printer controller to define finishing action on the print media. For instance, automatic slitters may have a number of slitter blades which are movable to the desired slit positions in response to printer instructions. While such automatic finishing equipment facilitates setup changes from job to job, the changes do not happen instantaneously. Adjustment times, including time to calibrate or verify the setup conditions can range from 30 seconds to a few minutes.

Such changes are more likely to occur at transitions between print jobs. It is envisioned that the metadata channel may be an appropriate means to send these set up commands to the finishing or preprinting equipment. The finishing equipment, however, will need time to respond to the instructions before the change is implemented. During the transition scrap is generated.

To minimize scrap, the printer controller may slow down the printing press prior to initiating the change in setup conditions. Then during the time that the setup change is occurring, a reduced volume of scrap will be generated. Once the finishing equipment is ready for the new job, the printer will begin sending data to the printheads for the new job.

The slowing down of the press will have reduced scrap, however, if printing is delayed until a response is received that the finishing equipment that ready, all the paper in the paper path between the first printhead and the finishing equipment will be scrap.

SUMMARY OF THE INVENTION

Briefly, according to one aspect of the present invention a system for reducing waste in a digital printer includes a web transport system for moving a print media through the digital printer at a first speed; at least one printhead for printing a first job on a first section of the print media; at least one finishing device in a first configuration which acts on the print media downstream of the printhead; slowing the web transport system to a second speed prior the end of the first job; changing the finishing device to a second configuration after the first job has passed the finishing device; estimating a time to complete changing the finishing device from the first configuration to the second configuration; estimating a time for a second section of the print media containing the starting point of the second job to arrive at the finishing device; and printing a second job on a second section of the print media prior to completion of the change from the first to second configuration based on the estimated time to completion and time for the second section to arrive at the finishing device.

To minimize this scrap, it is necessary to start printing at the proper time in anticipation of the adjustment being complete. This can be accomplished by making use of the characteristic response time for the limiting piece of finishing equipment. For each type of finishing equipment a typical response time can be measured. These response times can be stored in memory located either in the finishing equipment or in the printer controller. When a setup change is called for, the response time will be read from memory. The start of printing of the second job can begin after a delay of the characteristic response time from the termination of printing for the first job.

While this system will reduce scrap, there is a possibility that the finishing equipment may take more the normal amount of time to respond. If that happens, the printer will need to reprint the documents that passed the finishing equipment before it signaled that it was ready. A metadata channel provides a means to identify those documents. As the signal for ready from the finishing equipment can be written into the metadata packet associated with a document, examining the data in the packet downstream of all print and finishing devices can confirm whether every station processed the document correctly. All documents not validated in this manner can be reinserted into the print stream.

The invention and its objects and advantages will become more apparent in the detailed description of the preferred embodiment presented below.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

High speed digital printing systems are used in the commercial printing industry for printing a wide variety of printing applications from printing short run catalogs, and advertisements to printing transactional printed products such as billings and investment reports.

Figure 1:
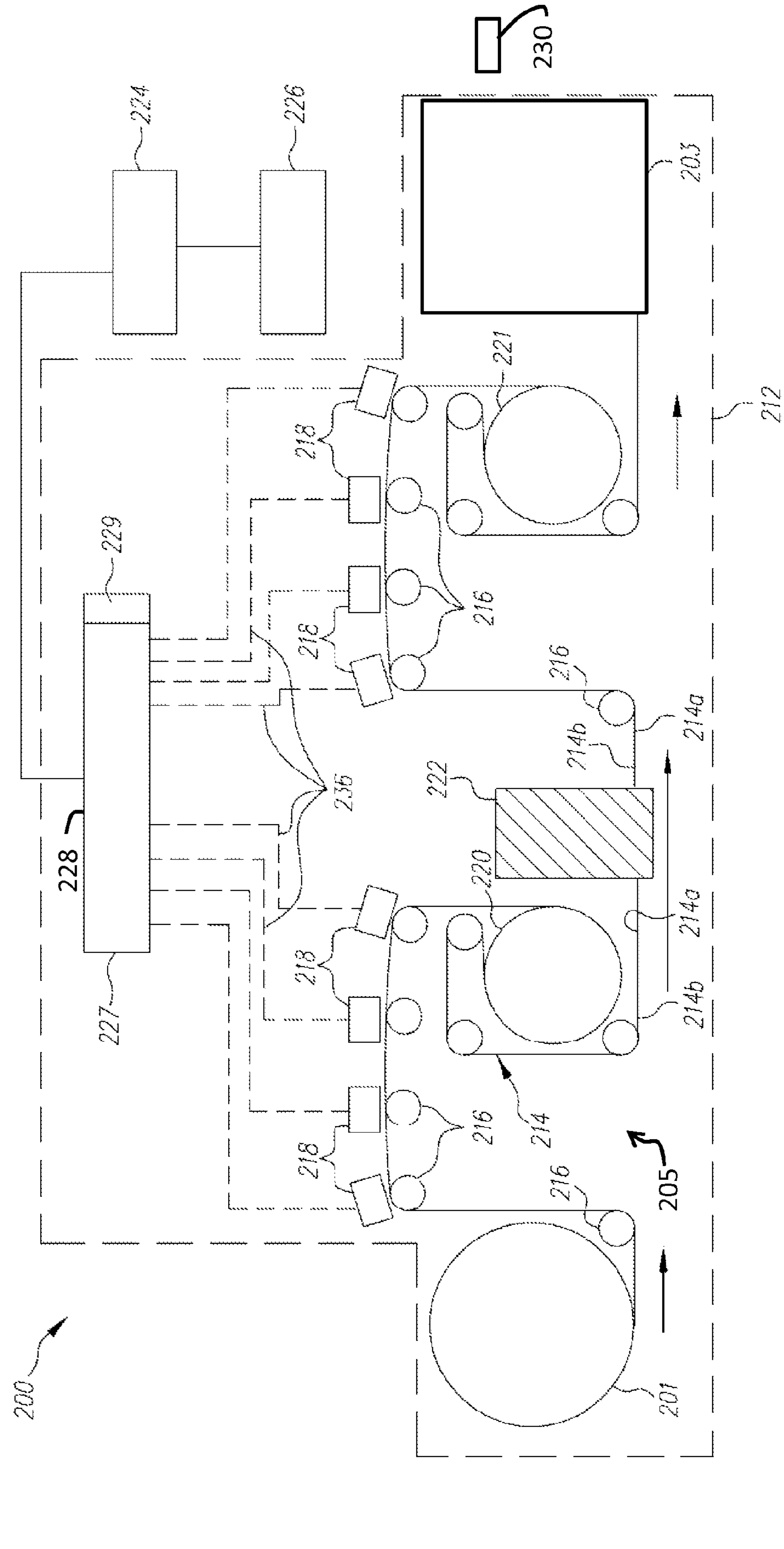
FIG. 1 is a diagrammatical view of an embodiment of the systems.

Referring to FIG. 1, the digital printing system 200 has a press (indicated by dashed line 212) that prints on a print media 214. The term "print media" refers to media that accepts a printed image and is singular or plural, as indicated by context. In particular embodiments discussed herein, the print media is supplied in the form of a web that is an elongate, continuous piece. The use of a web typically allows the press (also referred to herein as a printer) to attain higher speeds in transport, than other forms of print media, such as cut-sheets. The print media is typically paper, but it can also be any of a large number of other types of print media. For example, the print media can be thin or thick paper stock (coated or uncoated) or transparency stock. The print media has opposed first and second surfaces 214*a*, 214*b* one or both of which may be printed.

The web is moved from a supply 201 to a finishing device 203 by a transport 205. Between the supply 201 and finishing device 203, the web is threaded around a number of rollers 216 and past one or more printheads 218. The printheads can be continuous ink jet printheads, drop on demand ink jet printheads, electrophotographic toning stations (with or without transfer rollers or the like), or other equivalent units of a variable printing technology. For simplicity, in the discussion here, the printheads are generally discussed in terms of an embodiment, in which all of the printheads are arranged in a sequence and each printhead extends across the full width of the print media. It will be understood that like considerations apply to other embodiments. For example, instead of using a full width printhead, a group of printheads can be arranged in parallel (non-sequentially) to print a wider print media.

The different printheads each print a printable image plane. A unit of image data that corresponds to an image plane is referred to herein as a "segment." The image planes are printed in registry with each other and, in combination, provide a document. The term "document" as used herein, thus, corresponds to the term "page," in ordinary usage and includes both surfaces. (The term "page" is sometimes also used in the art as a technical term to refer to a frame, and is generally avoided here for that reason.) Each image plane can define an image area corresponding to the full dimensions as the document or can define a smaller area within those dimensions. Each image plane represents a part of a document that is conveniently printed separately. For example, each image plane can use a different color of ink. With ink jet printheads, different image planes can be used to divide an image into different patterns of relatively spaced apart deposited drops. The resulting combined image is unchanged, but the different interlaced patterns be used to improve drying, print speed, or crosstrack resolution, during the printing process.

Two sets of four printheads 218 are shown in FIG. 1. The invention is not limited as to a particular number of printheads or sets of printheads. In FIG. 1, the print media is moved through the printing system by media transport 205. The print media is printed on by one set of printheads 218 as the print media is moved relative to the printheads by the media transport at a first speed. After being moved past one set of printheads 218, the printed image (not shown) on a first side 214*b* of the print media 214 is dried by contact with a first heated drum dryer 220. Other types of dryers can be used depending on the application. The web is then flipped over by a turn station 222 before being moved past the second set of printheads 218 at the first speed and the second side 214*a* is then dried by a second dryer 221. The print media continues through the printing system to a finishing device 203 at the first speed. The printheads 218 each receive the data to be printed from the data control unit 227 via signal paths 236.

Figure 2:
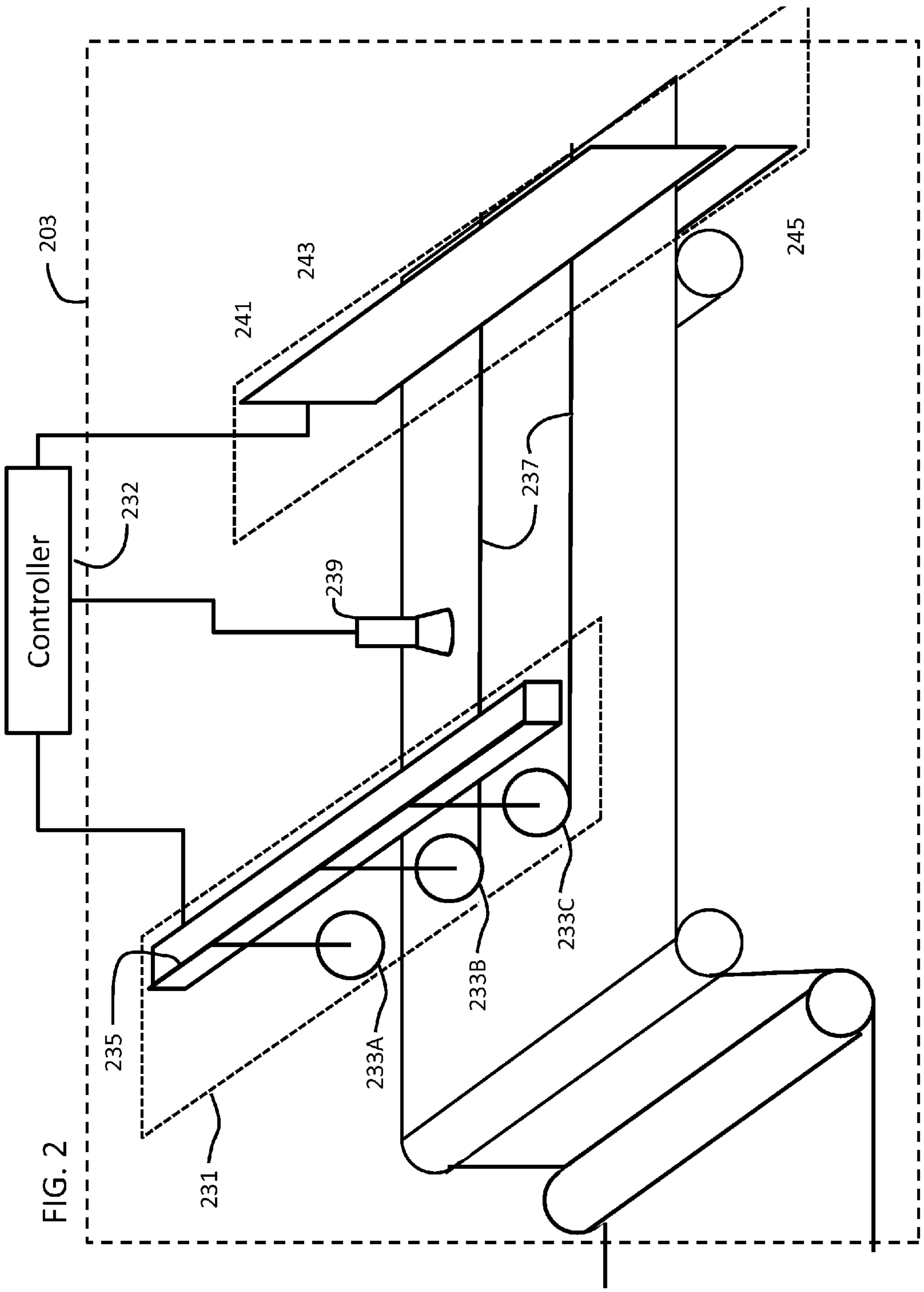
FIG. 2 is a schematic view of an embodiment of finishing device according to an embodiment of the invention.

FIG. 2 illustrates an exemplary finishing device 203. The print media 214 enters the finishing device 203 on the left. The finishing device includes a slitting unit 231. The slitting unit is shown having three slitting wheels 233A-233C, though various slitting units can have other numbers of slitting wheels. Under the direction of a controller 232, actuator 235 can locate the slitting wheels at desired locations across the width of the print media. The controller 232 may be the main controller 228 or it may be a separate controller that interacts with the main controller. The actuator can also deactivate slitting wheels that aren't needed for a particular print job. The slitting unit can deactivate a slitting wheel by, for example, raising a slitting wheel so that it doesn't contact the paper or by displacing the unneeded slitting wheels to the side of the web of print media. Slitting wheels 233B and 233C are activated, so that they create slits 237 in the print media. Slitting wheel 233A has been deactivated so that it does not slit the print media.

The exemplary finishing device 203 also includes a cutting unit 241 for cutting the web into desired lengths. The first blade 243 and the second blade 245 of the cutting unit to engage to cut the print media; the cuts typically are perpendicular to the direction of print media motion. The spacing between cuts can be altered under the direction of the controller 232. The exemplary finishing device is also shown to include a verification device 239. The verification device can include a camera or other sensor to confirm the quality of the documents being printed. This can include confirming that the proper information was printed on a document. The verification unit can also include one or more illumination source to enable the camera or other imaging device to inspect the print quality of the documents. The placement of the verification device across the print width, the activating of the illumination source, and timing of image acquisition are functions that can be changed in response to commands from the controller 232. The exemplary finishing device 203 is shown to include multiple units: slitting unit, cutting unit, and a verification device. A finishing device for the digital printing system is not limited to multi-function units. A finishing unit can carry out one or more finishing operations on printed documents to advance the printed documents or collection of documents to the form of the finished items 230.

Different print jobs can have different requirements for finishing, which may require the finishing device configuration to change after the completion of a first print job and before the finishing device 203 acts on the documents of a second print job. The invention enables efficient changes in finishing device configuration. It does so by slowing down the transport of the print media through the printing system before the end point of the first print job reach the finishing device. The end point of the first job is at the trailing edge of the print media that makes up the last documents of the first print job.

In use, printing data is first supplied to a data station 224 by one or more input units 226 from one or more image data sources. The data station includes at least some of the functions necessary to prepare the job data for the printheads and can optionally combine all of the functions in a single unit. The data station can also provide a system manager and user interface (not separately illustrated). The system manager provides a communication hub, and system level administration and control features for other system components. The user interface provides setup and status information for the operation of the system. Via this interface, the user can input to the controller the physical characteristics of the printer, such as the relationships of the printheads, desired colors the system is capable of printing, and other information. Upon a power-up or a reset, the data station initializes the system to a ready state.

As discussed further below, the job data can be a single print job or a series of print jobs. The printing data represents the location, color, and intensity of each pixel that is exposed and is in the form of one or more data files, which typically include or are accompanied by control commands. For example, data files can be supplied in a PDL (page description language) format, such as Postscript or IPDS or IJPDS. Printing data can be supplied from multiple sources, for combination during printing, as is known in the art. One input unit 226 is typically a locally connected host computer capable of supplying the printing data in a continuous stream. Software controls the flow of data from the host computer and via a host interface. The connection between the data station and the host computer can be unidirectional or can be bidirectional to allow status information and the like to be presented on a user interface of the host computer. Suitable software for this purpose is well known to those of skill in the art. Other types of input unit can be used instead of or in addition to a host computer. The job data are sent to a data control unit 227, which includes a main controller 228, a memory section 229, and a set of downstream processors 254. The job data is sent to the main controller 228, either directly or via input queue memory. The term "memory" refers to one or more suitably sized logical units of physical memory provided in semiconductor memory or magnetic memory, or the like (illustrated by memory section 229). Memory can include conventional memory devices including solid state, magnetic, optical or other data storage devices and can be fixed within system or can be removable. A particular queue in memory can be a logical division or physical division of memory section 229. If a logical division, the physical memory allocated to that logical division can be in the same or different locations and can change during use, without effecting the logical division. Likewise, a queue provided in a physical unit of memory can be altered logically, for example, by changing a pointer, to change the print queue during use. The use of queues is generally discussed herein in relation to movement of print jobs into and out of the print queues. It will be understood that, in some cases, movement of a print in or out of a queue will entail division of the print job into separately movable portions.

Figure 3:
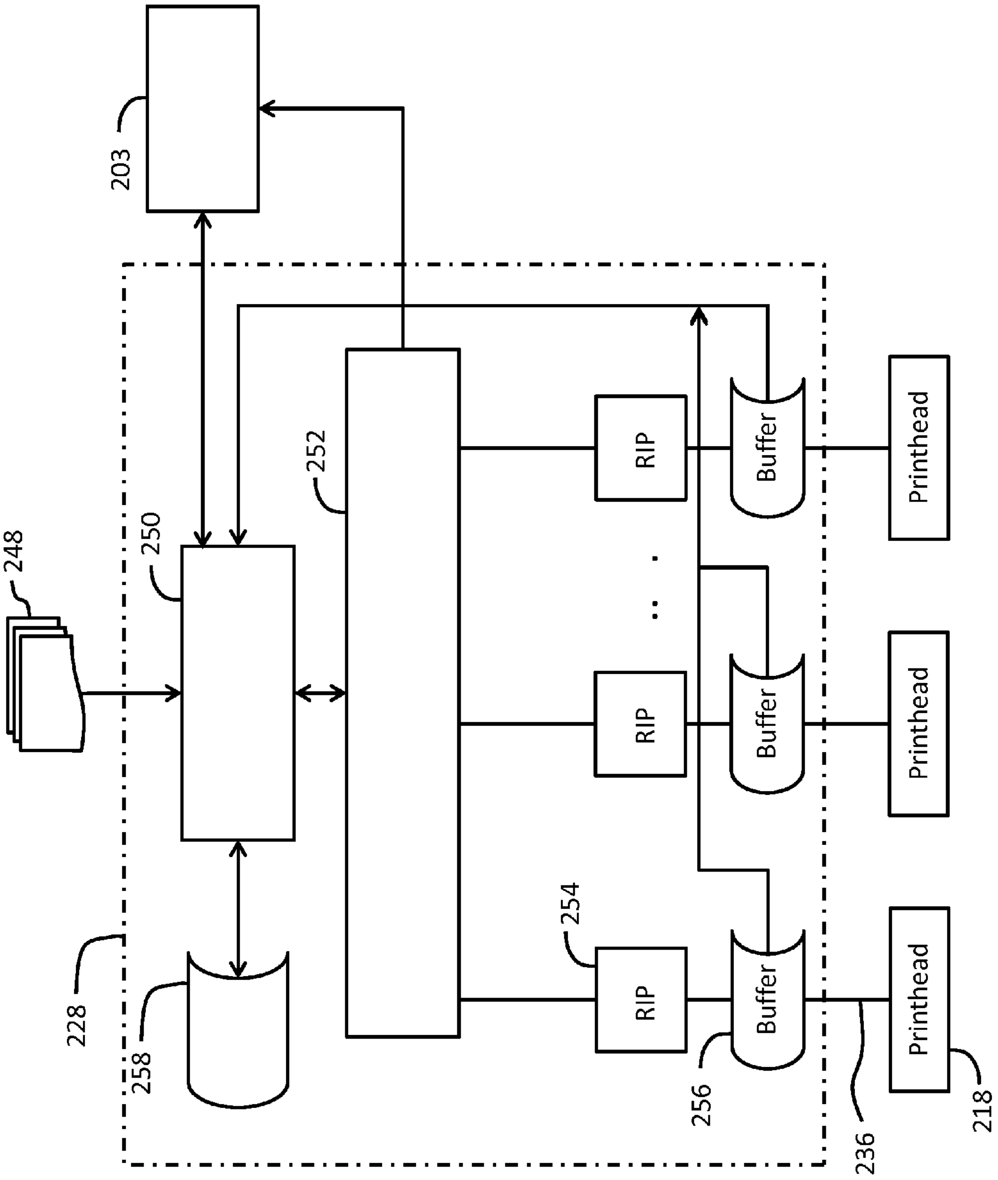
FIG. 3 is a schematic view of the control and data processing of an embodiment of the present invention.

Referring to FIG. 3, the main controller 228 has a supervisor 250 that receives the print job data and a job record processor 252 that segments the print job data and distributes the segments. The segments are each distributed to the appropriate downstream processors 254, which then supply the printheads with print data via signal paths 236. The downstream processors are typically raster image processors (RIPs), which convert the image data into a bitmap form appropriate for the printheads. The output of the RIPs are typically stored in buffers until the data is retrieved from the buffer and printed by the appropriate printhead.

The job record processor 252 also distributes commands necessary for the respective downstream processors and printheads. A processor buffer (not shown) can be used to store the segments between the job record processor 252 and the downstream processors 254. In addition to distributing the segments, the job record processor processes control parameters (sometimes referred to as "input records"), which apply to the entire job. For example, the job record processor handles the job control record, which is typically the first input record and specifies the job name, number of downstream processors, and the like. The control parameters can also include control parameters related to the configuration of the finishing device(s) 203. These are extracted by the job record processor 252 and sent to the finishing device 203. In some embodiments, the supervisor 250 is used to extract the finishing device configuration data or commands from the print job data rather than the job record processor 252.

The downstream processors 254 receive the respective segments and convert the commands and data into printable bitmaps compatible with the printheads 218. The conversion generally includes raster image processing that is applied to print data in the form of page description language to produce bitmapped documents that can then be printed without further modification, but the processing can differ and the printable documents can be subject to further processing before printing. For example, the downstream processors may receive pre-ripped bitmaps and simply convert them into final form ready for output. Each downstream processor supplies printable data to one or more printheads 218. As with other components discussed herein, the downstream processors can each be provided in the form of software or hardware or a combination of the two. In a particular embodiment, efficiency is improved by including one or more microprocessors in each downstream processor used, with each downstream processor corresponding to one of the segments of a print job.

The processing in the different downstream processors is asynchronous, that is, each downstream processor performs processing of a respective segment in a manner that is not synchronous with the processing of the other segments in the other downstream processors. Processing in different downstream processors in synchrony is not practical, in view of communications delays, the effect of errors and the like, and the fact that processing time, particularly raster image processing, is dependent upon content of the respective segments. The processing in the different downstream processors is also asynchronous with the printing of the bitmaps by the printheads. To accommodate the asynchronous processing by the downstream processors, the outputs of the downstream processors are stored in buffers 256 until transferred to the printheads via signal paths 236 and printed.

The print queues supply the printheads. The data usage rate at the printheads varies with the speed of transport of the print media. The quantity of bitmapped data stored in the buffers ready for printing is provided to the supervisor 250. The supervisor 250 can regulate the amount of bitmapped print data stored in the buffers by controlling the rate at page data is supplied to the downstream processes, and by adjusting the speed at which the print media is transported through the printing system as has been described in U.S. Pat. No. 6,762,855 and U.S. Pat. No. 7,911,636.

FIG. 3 shows a job data 248 containing a stream of print jobs being received by the supervisor 250 of the main controller 228. The supervisor passes a single print job of the stream to a job record processor 252 or transfers the print job to the input queue 258, in response to a ready or not ready signal supplied by the job record processor. The job record processor 252 accepts the print job data from the supervisor 250 until it encounters a start of job statement in the data stream, which indicates the start of a second print job. At this point, it signals the supervisor, causing the supervisor 250 to stop the transfer of print data at the end of the first print job. The supervisor then sequesters the second print job in the input queue 250 until the job record processor 252 signals that it is ready to receive the second print job. A method by which the second print job is sequestered until the job record processor 252 signals that it is ready to begin processing the second print job has been described in more detail in U.S. Pat. No. 7,911,636.

The controller which includes the supervisor, which also receives information from the buffers and the job record processor, determines the amount of the first print job yet to be printed and subsequently operated on by the finishing device. It then instructs the media transport to slow down. The print media is decelerated at a controlled rate that ensures that the image planes stay properly registered and that the finishing device stays properly registered. In some embodiments, the controller initiates deceleration at the proper time to cause the print media to reach a second speed as the final document passes through the finishing device 203. In some embodiments, the second speed for the print media is approximately the slowest speed at which the print media can pass through the printing system will maintaining consistent tension and motion of the print media to maintain stable tracking of the print media, both in the crosstrack direction and the in-track direction, as it passes through the printing system. By continuing to slowly move the print media through the printing system during the configuration changeover, rather than stopping the web of print media, the registration of the print from the various printhead tends be maintained more effectively. Thus better print quality is provided at the start of the second print job when the web continues to move during the configuration changeover than if the print media is stopped.

In some printing systems, the printing system may require the print media to be moving a speed above the minimum tracking speed until after the end point of the first print job is printed on by the last, most downstream, printhead, or until the end point of the first print job has passed through the finishing device. In such printing systems, the second speed is the speed required to ensure proper operation of the printheads and finishing device to ensure proper print quality and registration. The media speed is slowed to the second speed, at which the last of the documents in the first print job are printed or pass through the finishing device. After that, the media speed is slowed below the second speed to the minimum tracking speed.

After the end point of the first print job has passed the finishing device, the control sends the commands to the finishing device 203 to initiate the change in the configuration of the finishing device that are required for the second print job. The change in configuration from the first configuration required by the first print job to the second configuration required of the second print job doesn't happen instantaneously The controller estimates the time required by the finishing device to complete the change from the first configuration used for the first print job to the second configuration required by the second job; change over times can range from 30 seconds to several minutes, depending on the type of finishing equipment involved and the magnitude of the change. To avoid creating defective documents, it is important that commencement of printing does not begin too early. If the printing of the second print job begins too early the document can move through or past the finishing device before the finishing device is in the second configuration. On the other hand, if the printing of the second print job is started too late, excessive amounts of blank print media are moved through the printing system and are wasted.

To avoid either starting too early or too late, an estimate is made of the change over time, $T_{co}$, from the first configuration to the second configuration. The estimate may be carried out by the controller of the printing system, by a controller integrated into the finishing device, or by some other means. The estimate may be obtained from test data of prior change over times, from look up tables, from specifications of the finishing device, or other appropriate means. An estimate is also carried out of the time required for the print media to move from the first printhead to the finishing device, $T_{pf}$. This time is estimated using the print media path length from the first printhead to the finishing device divided by the print media speed. After initiating the configuration change of the finishing device, the controller initiates the printing of the second print job following a wait time $T_{wt}$ based on the estimated time to complete the change over, $T_{co}$, minus the time for the print to moved from the first printhead to the finishing device, $T_{pf}$, $T_{wt}=T_{co}-T_{pf}$.

During the wait time, $T_{wt}$, the printing system need not be idle while the configuration of the finishing device is changed. The controller can begin processing the print data of the second print job, ripping the print data into print ready bitmaps and filling the print buffers 256 with the print ready bitmaps. Depending on the length of the wait time, the printing system can perform various diagnostic functions. The diagnostic tests can include such as performing color consistency tests between the several printheads that span the print width, such as are described in U.S. Publication No. 2010/0304667 and image registration tests between printheads. The controller may also initiate printhead health diagnostics to confirm that all the jets are printing properly. The controller may also initiate certain printhead maintenance or cleaning functions, such as described in U.S. Pat. No. 7,967,423. Various other diagnostic and maintenance operations can additionally or alternatively be performed during the wait time, depending on the printing technology used in the digital printing system.

Following the wait time, printing of the second print job begins, typically while the print media continues to be moved through the printing system at the second speed. As the printing begins before the completion of the configuration change, some embodiments of the printing system carry out a verification function to ensure the finishing device completes the configuration change before the starting point of the second print job arrive at the finishing device. The starting point of the second job is at the leading edge of the print media that makes up the first document of the second print job. In some embodiments, the verification function can include the use of a verification device inspecting the documents as they pass through or leave the finishing device. The verification device may, for example, verify that the slitting or cutting of the documents be properly registered to the printed content of the documents.

In some embodiments, the verification function may involve tracking the movement of the printed first document of the second print job as it moves along the media path and verifying that the starting point doesn't arrive at the finishing device prior to the completion of the configuration change. The systems described in U.S. Publication Nos. 2012/0050786 and 2012/0027176 provide tracking system configurations that enable such a tracking of the printed documents. In one embodiment, metadata packets associated with each document are tracked as the print media advances through the printing system. If the first documents of the second print job, and the associated metadata packet advance through the printing system to the finishing device 203 before the finishing device signals that it has completed the configuration change over, the metadata packets associated with those documents are modified to indicate that the document is defective. The printing system upon detection of such modified metadata packets causes the corresponding documents to be discarded as scrap and the document are reprinted. Using such tracking systems, the controller confirms that the first printed documents don't arrive at the finishing device before the configuration changes is complete and the finishing device sends a completion signal to the controller.

Once the configuration change of the finishing device is complete and the printing of the second print job has started, the controller increases the speed of the print media through the print system to a third speed, an operating speed for efficient printing of the second print job. The third print speed may be the same as the first print speed or different, depending on the characteristics of the first and the second print jobs.

The invention has been described in detail with particular reference to certain preferred embodiments thereof, but it will be understood that variations and modifications can be effected within the scope of the invention.

PARTS LIST

200 digital printing system
201 supply
203 finishing device
205 transport
212 dashed line
214 print media
214*a* first surface
214*b* second surface
216 rollers
218 printheads
220 first dryer
221 second dryer
222 turn station
224 data station
226 input units
227 data control unit
228 main controller
229 memory section
230 finished items
231 slitting unit
232 controller
233A slitting wheel
233B slitting wheel
233C slitting wheel
235 actuator
236 signal paths
237 slit
239 verification device
241 cutting unit
243 first blade
245 second blade
248 job data
250 supervisor
252 job record processor
254 downstream processor
256 buffer
258 input queue

The invention claimed is:

1. A system for reducing waste in a digital printer comprising:
- a web transport system for moving a print media through the digital printer at a first speed and which slows to a second speed prior the end of a first job;
- at least one printhead for printing the first job on a first section of the print media;
- at least one finishing device in a first configuration which acts on the print media downstream of the printhead and changes to a second configuration after the first job has passed the finishing device;
- a main controller for estimating a time to complete changing the finishing device from the first configuration to the second configuration and estimating a time for a second section of the print media containing the starting point of the second job to arrive at the finishing device; and
- wherein the printhead prints a second job on a second section of the print media prior to completion of the change from the first to second configuration based on the estimated time to completion and time for the second section to arrive at the finishing device.

2. The system of claim 1 comprising:
- a verification device for verifying that the change to the second configuration has been completed prior to the second section arriving at the finishing device.

3. The system of claim 2 comprising:
- reprinting portions of the second job which arrived at the finishing device prior to completion of the change to the second configuration.

4. The system of claim 1 comprising:
- a controller for increasing the web transport speed to a third speed after completion of the change to the second configuration.

5. The system of claim 1 wherein a controller of the printer performs at least one diagnostic test between completion of printing the first print job and beginning to print the second job.

6. A system for reducing waste in a digital printer comprising:
- a web transport system for moving a print media through the printer at a first speed and which slows to a second speed prior to the end of a first job based on the estimated time for a first section of the print media containing the end of the first job to arrive at the finishing device;
- at least one printhead for printing the first job on the print media;
- at least one finishing device in a first configuration which acts on the print media downstream of the printhead and which changes to a second configuration after the first job has passed the finishing device;
- a main controller for estimating a time for a first section of the print media containing an end point of the first job to arrive at the finishing device and which estimates a time to complete changing the finishing device from the first configuration to the second configuration and which estimates a time for a second section of the print media containing a starting point of the first job to arrive at the finishing device; and
- wherein the printhead prints a second job on a second section of the print media prior to completion of the change from the first to second configuration based on the estimated time to completion and time for the second section to arrive at the finishing device.

* * * * *